US010419496B2

(12) United States Patent
Panchalingam et al.

(10) Patent No.: US 10,419,496 B2
(45) Date of Patent: Sep. 17, 2019

(54) SYMMETRIC BI-DIRECTIONAL POLICY BASED REDIRECT OF TRAFFIC FLOWS

(71) Applicant: Cisco Technology, Inc., San Jose, CA (US)

(72) Inventors: Murukanandam Panchalingam, San Jose, CA (US); Umamaheswararao Karyampudi, San Jose, CA (US); Pirabhu Raman, San Jose, CA (US); Sameer Merchant, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 398 days.

(21) Appl. No.: 15/186,304

(22) Filed: Jun. 17, 2016

(65) Prior Publication Data

US 2017/0366506 A1 Dec. 21, 2017

(51) Int. Cl.
*H04L 29/06* (2006.01)
*H04L 12/743* (2013.01)

(52) U.S. Cl.
CPC ...... *H04L 65/1006* (2013.01); *H04L 45/7453* (2013.01)

(58) Field of Classification Search
CPC ............. H04L 63/0263; H04L 63/0254; H04L 65/1006
USPC .......................................................... 726/1
See application file for complete search history.

(56) References Cited

U.S. PATENT DOCUMENTS

| 6,738,371 | B1* | 5/2004 | Ayres ...................... H04L 47/10 370/352 |
| 7,583,664 | B2* | 9/2009 | Ho ...................... H04L 12/5601 370/369 |
| 7,864,672 | B1* | 1/2011 | DeCaluwe .............. H04L 43/06 370/229 |
| 8,891,364 | B2 | 11/2014 | Gopinath et al. |
| 9,077,656 | B2* | 7/2015 | Gallatin .............. H04L 12/4645 |
| 9,178,805 | B2 | 11/2015 | Goel |
| 9,178,850 | B2 | 11/2015 | Lain et al. |
| 9,716,592 | B1* | 7/2017 | Mandal ................ H04L 67/1023 |
| 2013/0156029 | A1* | 6/2013 | Gallatin .............. H04L 12/4645 370/389 |
| 2015/0106526 | A1 | 4/2015 | Arndt |
| 2015/0312171 | A1 | 10/2015 | Gallatin et al. |

* cited by examiner

*Primary Examiner* — Jason K Gee
*Assistant Examiner* — Angela R Holmes
(74) *Attorney, Agent, or Firm* — Polsinelli PC (57) ABSTRACT

Disclosed are systems, methods, and computer-readable storage media for guaranteeing symmetric bi-directional policy based redirect of traffic flows. A first switch connected to a first endpoint can receive a first data packet transmitted by the first endpoint to a second endpoint connected to a second switch. The first switch can enforce an ingress data policy to the first data packet by applying a hashing algorithm to a Source Internet Protocol (SIP) value and a Destination Internet Protocol (DIP) value of the first data packet, resulting in a hash value of the first data packet. The first switch can then route the first data packet to a first service node based on the hash value of the first data packet.

17 Claims, 9 Drawing Sheets

SYMMETRIC BI-DIRECTIONAL POLICY BASED REDIRECT OF TRAFFIC FLOWS

TECHNICAL FIELD

This disclosure relates in general to the field of computer networks and, more particularly, pertains to guaranteeing symmetric bi-directional policy based redirect of traffic flows.

BACKGROUND

Security is a basic building block in current Data Center Networking Fabric. Endpoints (EPs) in the fabric are categorized into End Point Groups (EPGs) for ease of central management as well as to apply security policies. EPs in different EPGs can communicate with each other only if there is a valid permit policy in place. Policy Based Redirect (PBR) of traffic flows, however, presents its own challenged. Consistent symmetric enforcement of PBR policies can be difficult to guarantee. Accordingly, improvements are needed.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for guaranteeing symmetric bi-directional policy based redirect of traffic flows. A first switch connected to a first endpoint can receive a first data packet transmitted by the first endpoint to a second endpoint connected to a second switch. The first switch can enforce an ingress data policy and the policy result can be to redirect the packet to a service node. To pick a particular service node out of many available, the first switch applies a hashing algorithm to a Source Internet Protocol (SIP) value and a Destination Internet Protocol (DIP) value of the first data packet and other fields as applicable, resulting in a hash value of the first data packet. This hash value is used to select a particular service node and then the first switch can redirect the first data packet to this service node.

Detailed Description:

Disclosed are systems and methods for guaranteeing symmetric bi-directional policy based redirect of traffic flows. A brief introductory description of exemplary systems and networks, as illustrated in FIGS. 1 through 4, is disclosed herein, followed by a discussion of guaranteeing symmetric bi-directional policy based redirect of traffic flows. The disclosure now turns to FIG. 1.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 1:
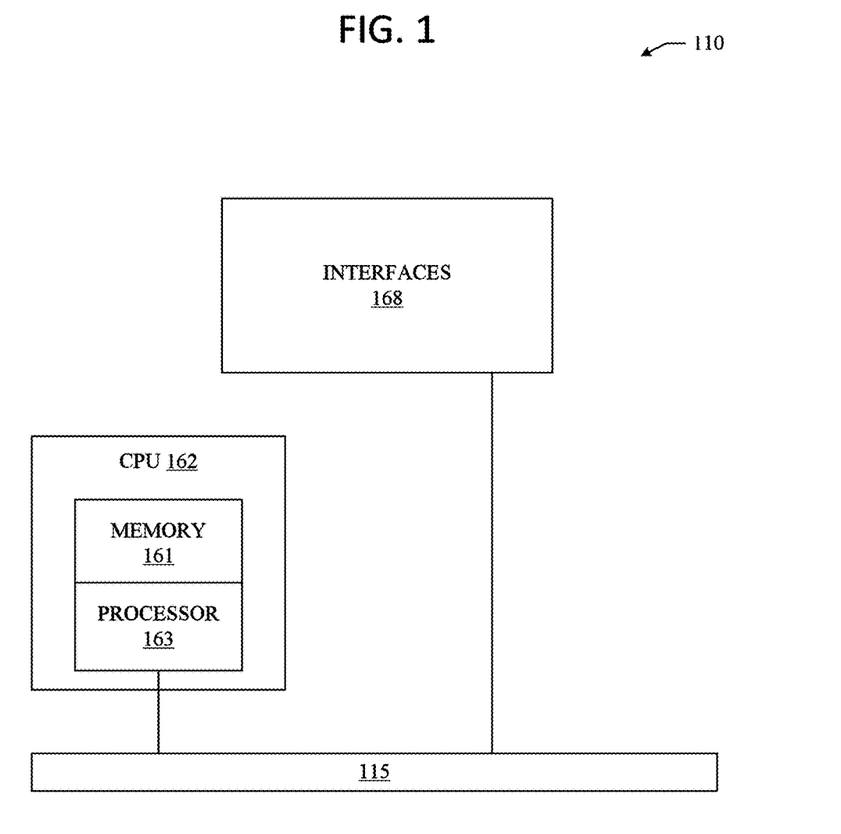
FIG. 1 illustrates an example network device according to some aspects of the subject technology.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
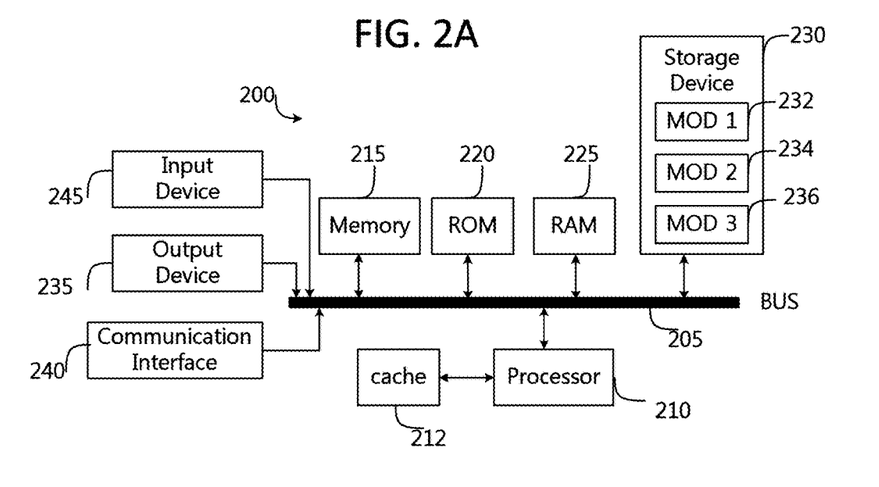
FIGS. 2A and 2B illustrate an example system embodiments according to some aspects of the subject technology.
Figure 2B:
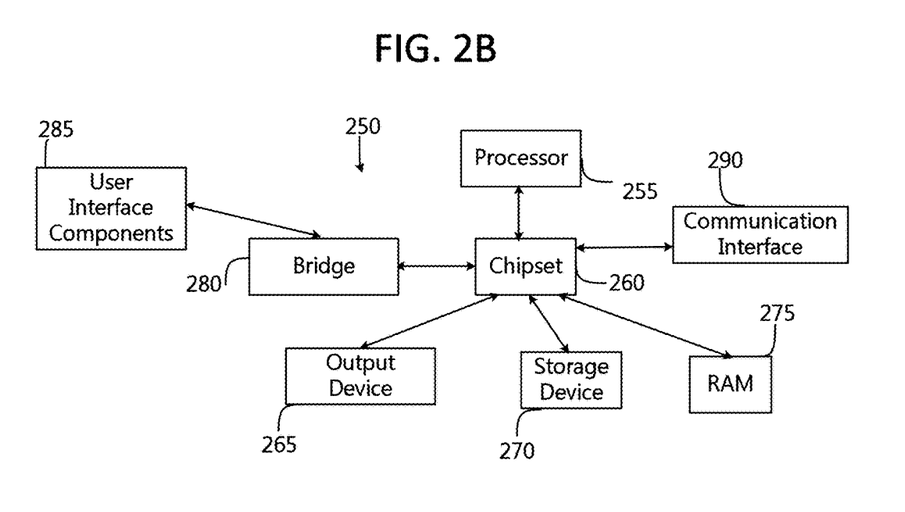

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
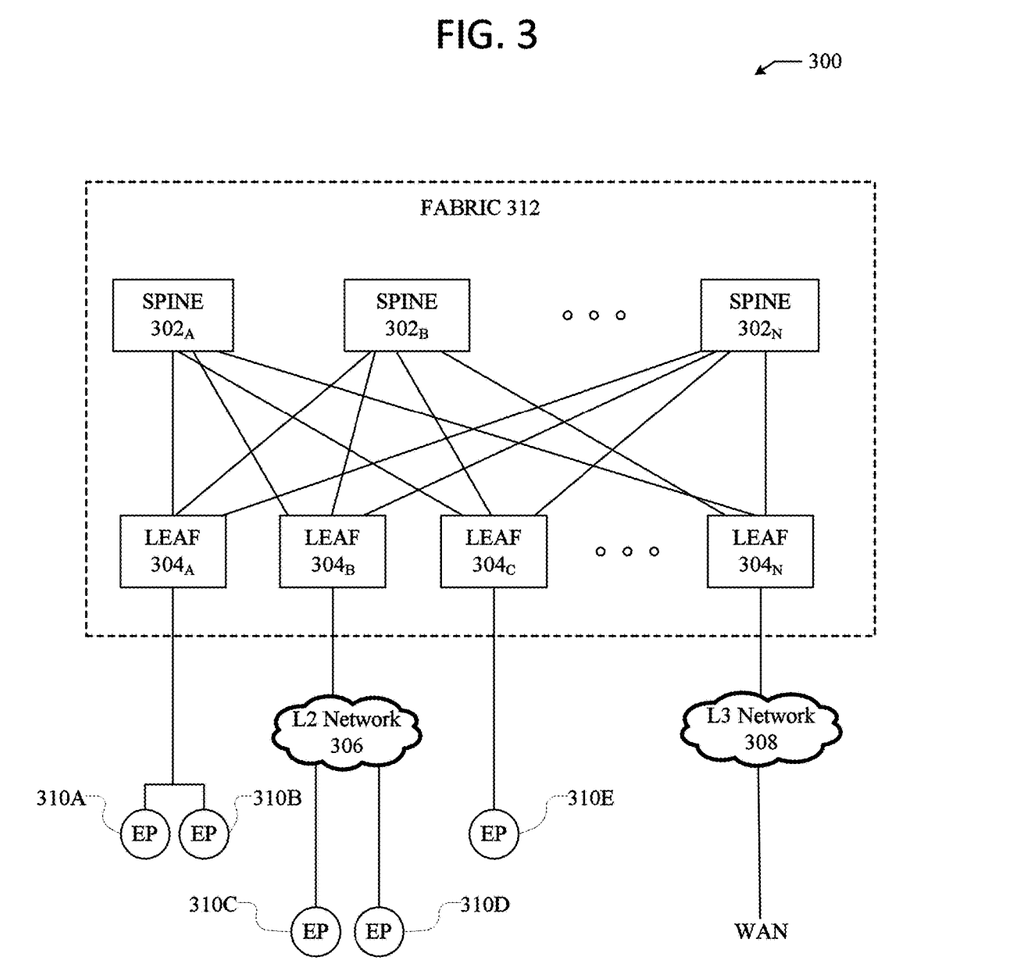
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
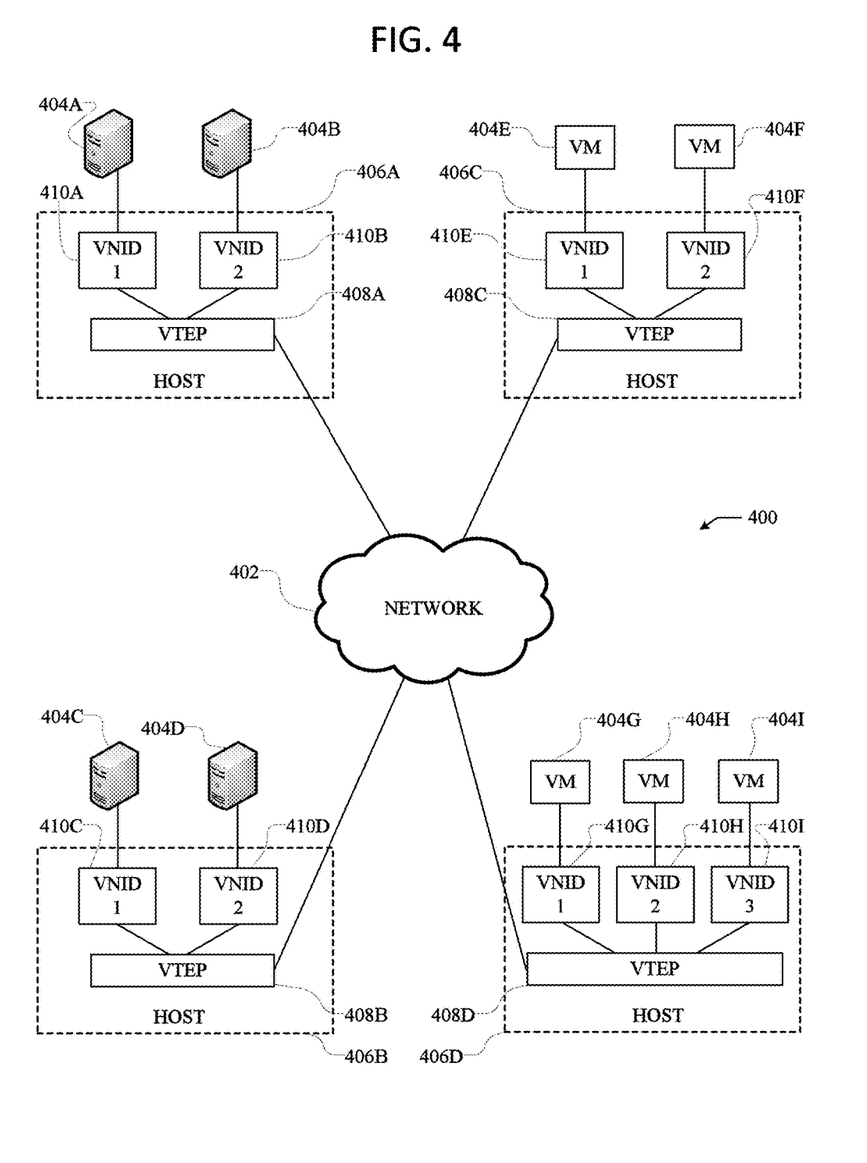
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Having disclosed a brief introductory description of exemplary systems and networks, the discussion now turns to guaranteeing symmetric bi-directional policy based redirect of traffic flows. Switches can be configured to provide symmetric bi-directional policy based redirect of traffic flows between endpoints. Switches connected to the endpoints can be configured to enforce a policy to route data packets to a service node, such as a firewall, either at the Ingress or Egress of the traffic flow. For example, a switch can apply a hashing function to data included in the data packet, such as the Source Internet Protocol (SIP) value and the Destination Internet Protocol (DIP) value of the data packet and route the data packet to an appropriate service node based on the resulting hash value. The hashing algorithm can be symmetric such that the same hash value is achieved when a data packet is transmitted between two endpoints, regardless of the direction. Initially, the policy can be enforced on data packets transmitted between two endpoints at the Ingress. Upon a determination that one of the endpoints has moved or in other scenarios, the policy can also be enforced at the Egress to guarantee symmetric bi-directional policy meaning a given traffic flow/stream always gets redirected to same service node within the data center/fabric. This flexibility to enforce ingress or egress policy with the fabric along with symmetric redirect behavior gives this solution the capability to guarantee the working of this feature whatever be the trigger.

Figure 5:
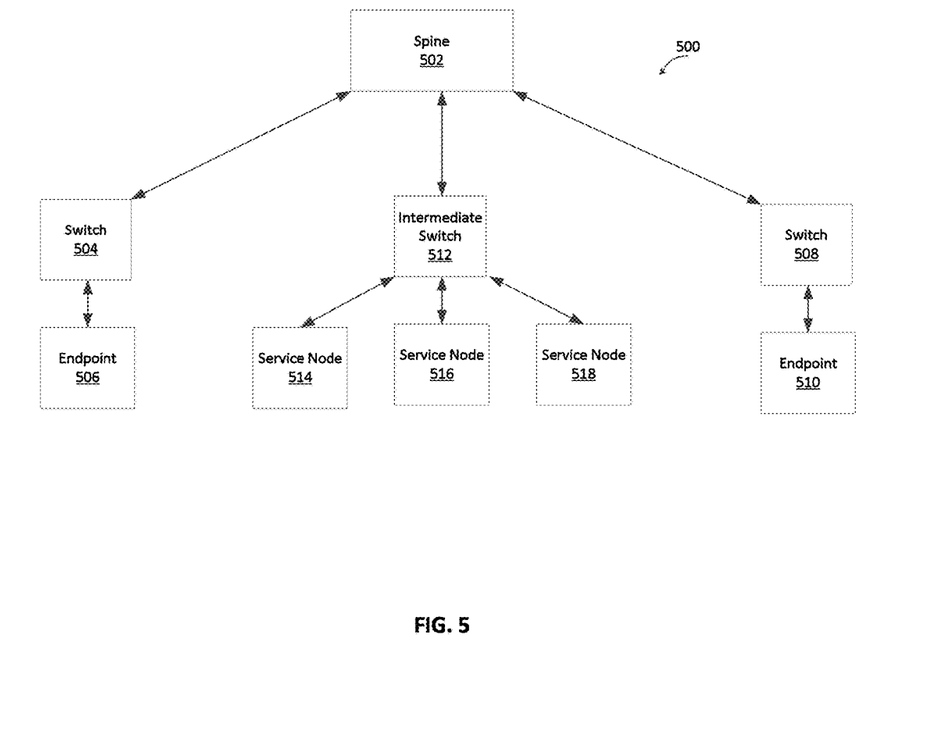
FIG. 5 illustrates an example system embodiment for guaranteeing symmetric bi-directional policy based redirect of traffic flows.

FIG. 5 illustrates an example system embodiment for guaranteeing symmetric bi-directional policy based redirect of traffic flows. As shown, system 500 includes spine 502, switch 504 connected to endpoint 506, switch 508 connected to endpoint 510 and intermediate switch 512 connected to service node 514, service node 516 and service node 518.

Switch 504 and switch 508 can be configured to apply policies to data traffic transmitted between endpoint 506 and endpoint 510. For example, switches 504 and 508 can enforce a policy to route data packets transmitted between endpoints 506 and 510 to one of service nodes 514, 516 or 518 via intermediate switch 512.

Switches 504 and 506 can enforce the policy either at the Ingress or Egress of the data flow. "Ingress policy enforcement" is enforced when a data packet transmitted by an endpoint enters the fabric and "Egress policy enforcement" is enforced when a data packet transmitted by an endpoint leaves the fabric. Accordingly, Ingress policy enforcement can be enforced by switch 504 for data packets transmitted from endpoint 506 to endpoint 510, and by switch 508 for data packets transmitted from endpoint 510 to endpoint 506. Likewise, Egress policy enforcement can be enforced by switch 508 for data packets transmitted from endpoint 506 to endpoint 510, and by switch 504 for data packets transmitted from endpoint 510 to endpoint 506. The policy is enforced only once at either the Ingres or the Egress, rather than at both.

The policy can cause switches 504 and 508 to provide guaranteed symmetric bi-directional policy based redirect of traffic. This means that data packet transmitted between endpoint 506 and endpoint 510 will be consistently be directed to the same one of service nodes 514, 516 and 518. Service nodes 514, 516 and 518 can be single device, such as a firewall. To guarantee symmetric bi-directional policy, switches 504 and 508 can apply a hashing algorithm to data included in the data packet and route the data packet to an appropriate service node based on the resulting hash value. For example, switches 504 and 508 can apply the hashing algorithm to data such as the Source Internet Protocol (SIP) value, the Destination Internet Protocol (DIP) value, the Protocol value, source port value, destination port value, etc. The SIP can indicate the IP address of the endpoint that initially transmitted the data packet. Likewise, the DIP can indicate the IP address of the endpoint that is the intended recipient of the data packet. The Protocol value can indicate the protocol used to transmit the data packet.

The hashing algorithm used by switches 504 and 508 can be symmetric such that the same hash value is achieved when a data packet is transmitted between two endpoints, regardless of the direction. Accordingly, the hash value resulting from data packets transmitted from endpoint 506 to endpoint 510 will be the same as the hash value for data packets transmitted from endpoint 510 to endpoint 506. Switches 504 and 508 can consistently route data packets to one of service nodes 514, 516 and 518 based on the resulting hash value such that each unique hash value is always routed to the same one of service nodes 514, 516 and 518. As a result, switches 504 and 508 will always route data packets transmitted between two endpoints to intermediate switch 512 for delivery to the same service node, regardless of the direction of the data flow.

Upon receiving a data packet back from one of service nodes 514, 516 and 518, intermediate switch 512 can transfer the data packet to the intended recipient. For example, upon receiving a data packet from service node 514 that is intended for endpoint 510, intermediate switch 512 can transfer the data packet to switch 508 via spine 502. Switch 508 can then forward the data packet to endpoint 510.

A controller (not shown) can be configured to notify switches 504 and 506 regarding whether to apply Ingress or Egress policy enforcement for data packets transmitted between two endpoints. Initially, switches 504 and 506 can be configured to apply Ingress policy enforcement to data packets. However, the controller can instruct or the fabric can dynamically reconfigure the switches to begin applying Egress policy enforcement in response to an endpoint moving or other similar triggers.

Figure 6A:
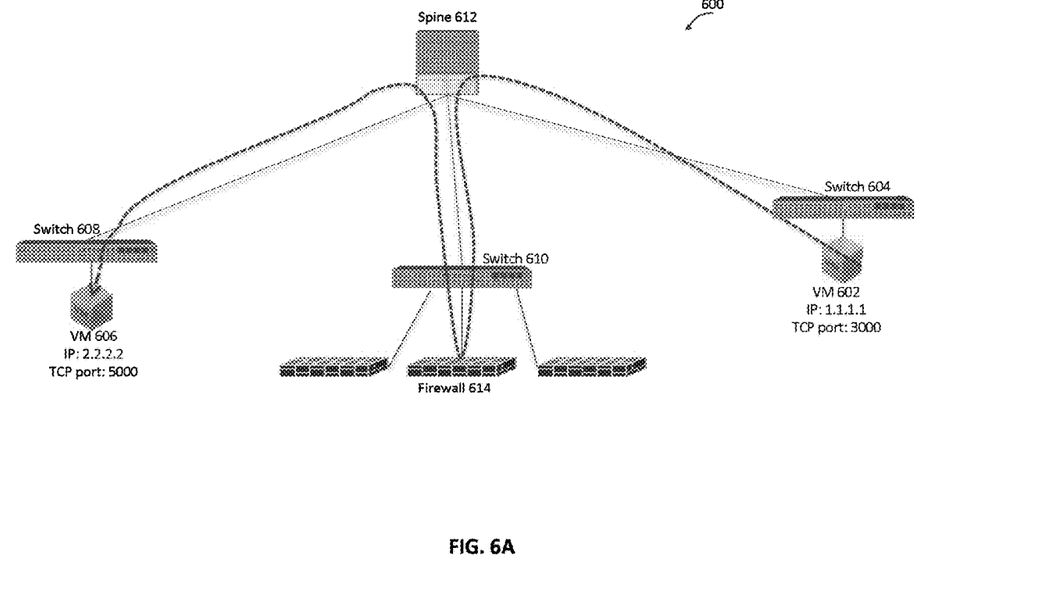
FIGS. 6A-6C illustrate an example of a data packet being transmitted in a system guaranteeing symmetric bi-directional policy based redirect of traffic flows.
Figure 6B:
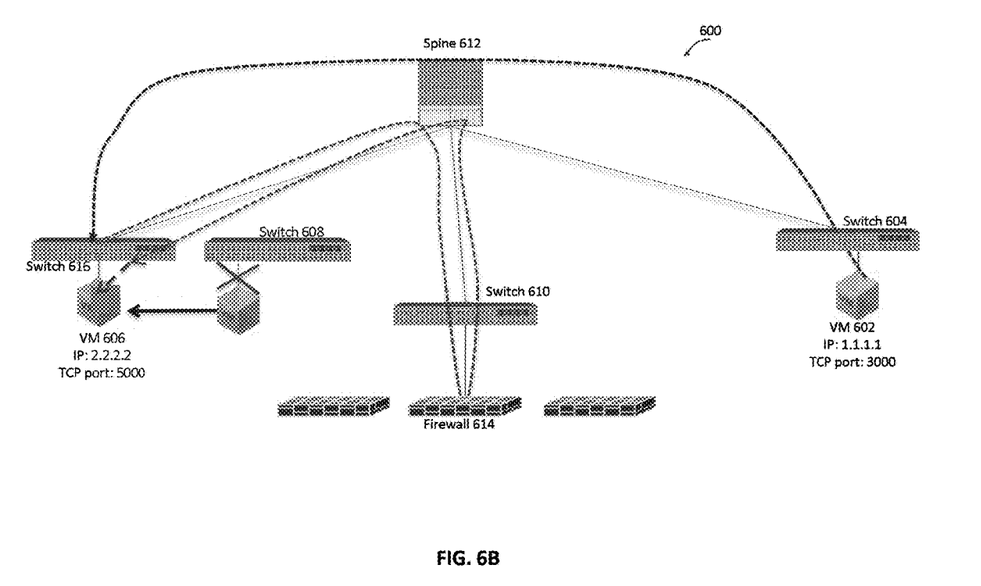
Figure 6C:
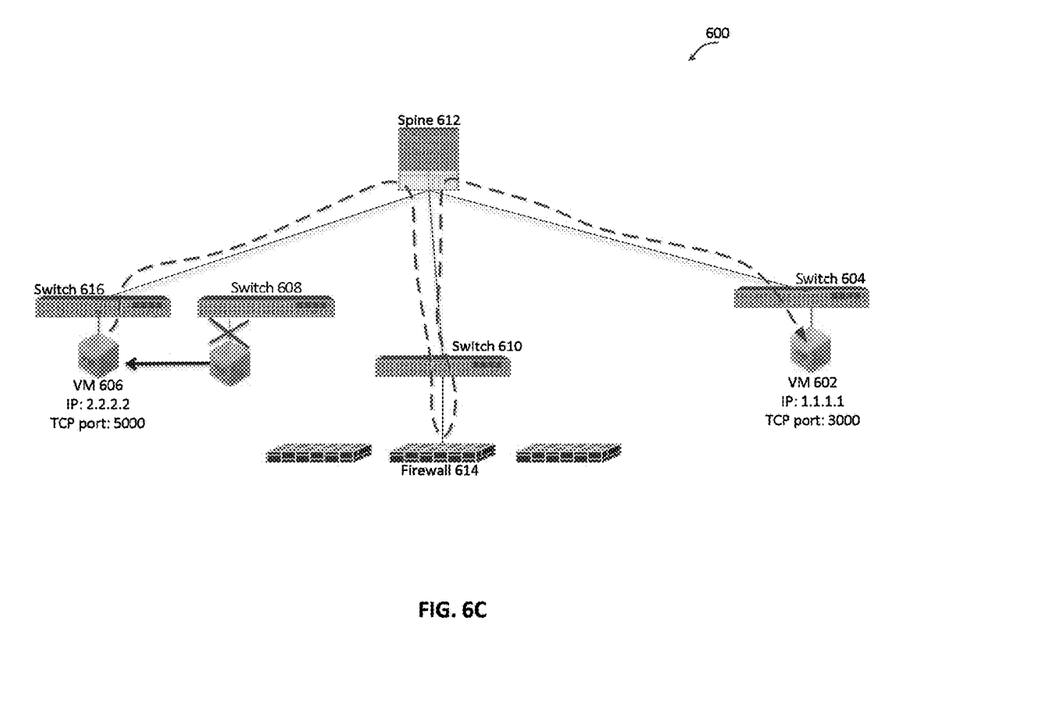

FIGS. 6A-6C illustrate an example of a data packet being transmitted in a system guaranteeing symmetric bi-directional policy based redirect of traffic flows. As shown, VNI 602 has an IP address of 1.1.1.1 and a TCP port value of 3000, and is connected to switch 604. VNI 606 has an IP address of 2.2.2.2 and a TCP port value of 5000, and is connected to switch 608.

A data packet transmitted from VNI 602 to VNI 606 can be first received by switch 604. Switch 604 can apply Ingress policy enforcement to the received data packet, causing switch 604 to transmit the data packet to firewall 614 via spine 612 and switch 610. For example, switch 604 can apply a hashing algorithm to data included in the data packet, such as the SIP value (i.e., 1.1.1.1) and the DIP value (i.e., 2.2.2.2). Switch 604 can then forward the data packet to firewall 614 based on the resulting hash value. For example, switch 604 can transmit the data packet to spine 612, which can transmit the data packet to switch 610, where it can then be routed to firewall 614.

In response to receiving the data packet back from firewall 614, switch 610 can transmit the data packet to switch 608 via spine 612 to be delivered to VM 606. Switch 608 does not enforce a policy to the data packet because switch 604 has already enforced the policy on the Ingress. Accordingly, switch 608 forwards the data packet to its intended recipient VM 606.

The hashing algorithm used to apply the policy can be symmetric such that the same hash value is achieved when a data packet is transmitted between VM 602 and VM 604, regardless of the direction. Accordingly, a data packet with a SIP value of 2.2.2.2 and a DIP value of 1.1.1.1 (i.e., a data packet transmitted from VM 606 to VM 602), will result in the same hash value as a data packet with a SIP value of 1.1.1.1 and a DIP value of 2.2.2.2 (i.e., a data packet transmitted form VM 602 to VM 606).

FIG. 6B shows another example of a data packet being transmitted in a system guaranteeing symmetric bi-directional policy based redirect of traffic flow. As shown, VM 606 has moved from switch 608 to switch 616. This can be a result of a failover or other error that necessitated that VM 606 be moved. VM 606 still has an IP address of 2.2.2.2 and a TCP port value of 5000. A controller (not shown) can push the appropriate policy to switch 616 upon VM 606 being moved to switch 616. VM 606 being moved to switch 616 can dynamically trigger Egress policy enforcement for packets transmitted from VM 602 to VM 606, which can be enforced until switch 604 learns that VM 606 has moved under switch 616.

A data packet transmitted from VM 602 to VM 606 can be first received by switch 604. Switch 604 can then forward the data packet to switch 616 via spine 612 without enforcing a policy. Switch 616 can apply an Egress data policy to the received data packet and transmit the data packet to firewall 614 via spine 612 and switch 610. For example, switch 616 can apply a hashing algorithm to data included in the data packet, such as the SIP value (i.e., 1.1.1.1) and the DIP value (i.e., 2.2.2.2). Switch 616 can then forward the data packet to firewall 614 based on the resulting hash value.

In response to receiving the data packet back from firewall 614, switch 610 can transmit the data packet to switch 616 via spine 612 to be delivered to VM 606. Switch 616 can then forward the data packet to its intended recipient VM 606.

FIG. 6C shows another example of a data packet being transmitted in a system guaranteeing symmetric bi-directional policy based redirect of traffic flow. A data packet transmitted from VM 606 to VM 602 can be first received by switch 616. Switch 616 can apply Ingress policy enforcement to the data packet and transmit the data packet to firewall 614 via spine 612 and switch 610. For example, switch 616 can apply a hashing algorithm to data included in the data packet, such as the SIP value (i.e., 1.1.1.1) and the DIP value (i.e., 2.2.2.2). Switch 616 can then forward the data packet to firewall 614 based on the resulting hash value.

In response to receiving the data packet back from firewall 614, switch 610 can transmit the data packet to switch 604 via spine 612 to be delivered to VM 602. Switch 604 can then forward the data packet to its intended recipient VM 606. As shown, by applying the data policy on either the Ingress or Egress, data packets transmitted between VM 602 and VM 606 will always be routed to firewall 614, regardless of direction.

Figure 7:
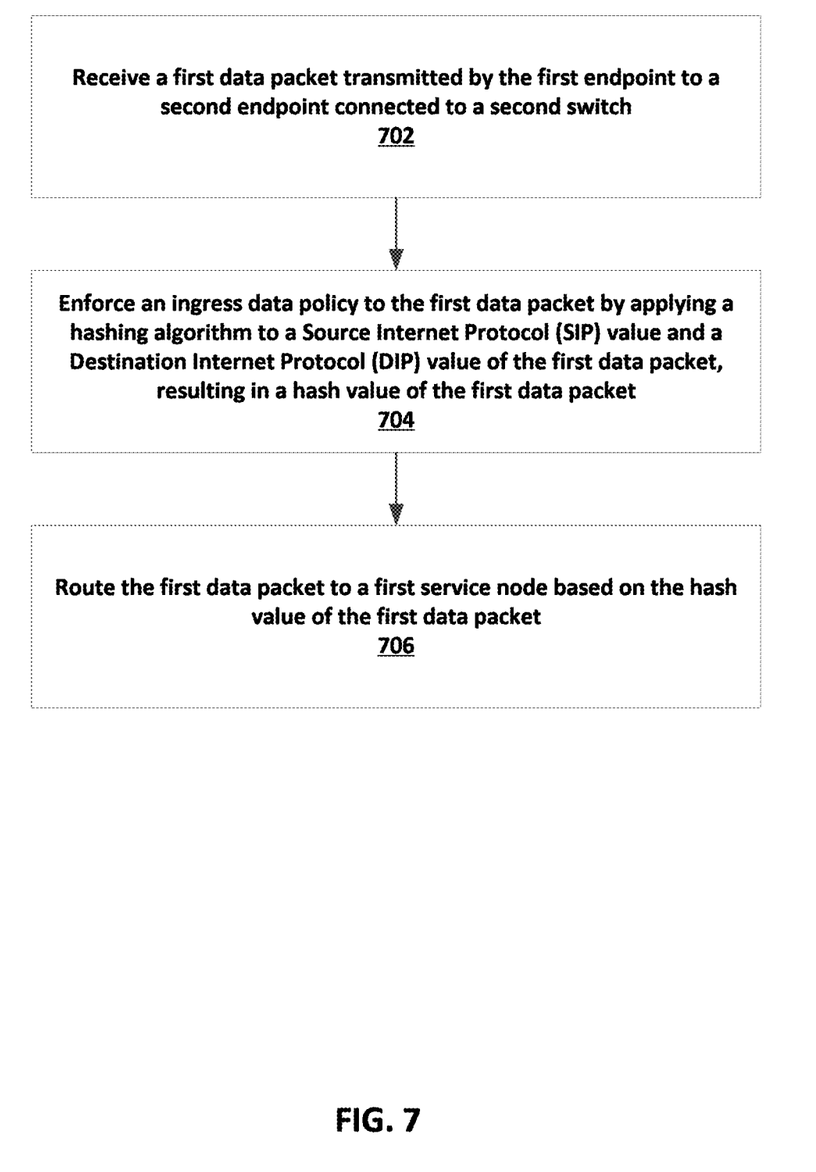
FIG. 7 illustrates an example method of guaranteeing symmetric bi-directional policy based redirect of traffic flows.

FIG. 7 illustrates an example method of guaranteeing symmetric bi-directional policy based redirect of traffic flows. It should be understood that there can be additional, fewer, or alternative steps performed in similar or alternative orders, or in parallel, within the scope of the various embodiments unless otherwise stated.

At step 702, a first switch connected to a first endpoint can receive a first data packet transmitted by the first endpoint to a second endpoint connected to a second switch.

At step 704, the first switch can enforce an ingress data policy to the first data packet by applying a hashing algorithm to a Source Internet Protocol (SIP) value and a Destination Internet Protocol (DIP) value of the first data packet, resulting in a hash value of the first data packet. The hashing algorithm can be symmetric such that the same hash value is achieved when a data packet is transmitted between the first endpoint and the second endpoint, regardless of the direction.

At step 706, the first switch can then route the first data packet to a first service node based on the hash value of the first data packet. Because the hashing algorithm will provide the same hash value for data packets transmitted between the first end point and the second end point, regardless of direction, data packets transmitted between the first endpoint and the second endpoint will always be routed to the first firewall.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for managing traffic through a switch fabric having a border defined at least by a plurality of leaf nodes connected by at least one spine node, the plurality of leaf nodes including at least first and second leaf nodes, the method comprising:
   receiving, by the first leaf node connected to a first endpoint, a first data packet transmitted by the first endpoint to a second endpoint connected to the second leaf node;
   enforcing, at entry of the first data packet into the switch fabric at the first leaf node, an ingress data policy to the first data packet by applying a symmetrical hashing algorithm to at least a portion of the first data packet, resulting in a hash value of the first data packet;
   routing the first data packet to a first service node based on the hash value of the first data packet;
   receiving, by the second leaf node, a second data packet transmitted by the second endpoint to the first endpoint;
   enforcing, at entry of the second data packet into the switch fabric at the second leaf node, an ingress data policy to the second data packet by applying the symmetrical hashing algorithm to at least a portion of the second data packet, resulting in a hash value of the second data packet; and
   routing the second data packet to the first service node based on the hash value of the first data packet;
   wherein, due to the symmetrical nature of the symmetrical hashing algorithm, data between the first and second endpoints are sent to the first service node regardless of the direction in which the data was sent.

2. The method of claim 1, further comprising:
   in response to determining that the second endpoint has moved from the second leaf node to a third node of the switch fabric, dynamically reconfiguring the first leaf node to stop enforcing the ingress data policy to data packets transmitted from the first endpoint to the second endpoint.

3. The method of claim 2, further comprising:
   after dynamically reconfiguring the first leaf node to stop enforcing the ingress data policy, receiving a second data packet transmitted by the first endpoint to the second endpoint; and
   transmitting the second data packet to the third leaf node, wherein the third leaf node enforces an egress data policy by applying the hashing algorithm to a Source Internet Protocol (SIP) value and a Destination Internet Protocol (DIP) value of the second data packet, resulting in a hash value of the second data packet, wherein the third leaf node routes the second data packet to the first service node based on the hash value of the second data packet.

4. The method of claim 1, wherein the first service node is a firewall.

5. The method of claim 1, wherein the first service node routes the first data packet to the second leaf node to be delivered to the second endpoint.

6. The method of claim 1, wherein a protocol value of the first data packet is also applied to the hashing algorithm to result in the hash value of the first data packet.

7. A system comprising:
   a switch fabric having a border defined at least by a plurality of leaf nodes connected by at least one spine node, the plurality of leaf nodes including at least first and second leaf nodes;
   a memory storing instructions that, when executed by any of the leaf nodes, cause the leaf nodes to:
     receive by the first leaf node a first data packet transmitted by a first endpoint to a second endpoint connected to the second leaf node;
     enforce, at entry of the first data packet into the switch fabric at the first leaf node, an ingress data policy to the first data packet by applying a symmetrical hashing algorithm to at least a portion of the first data packet, resulting in a hash value of the first data packet;
     route the first data packet to a first service node based on the hash value of the first data packet;
     receive, by the second leaf node, a second data packet transmitted by the second endpoint to the first endpoint;
     enforce, at entry of the second data packet into the switch fabric at the second leaf node, an ingress data policy to the second data packet by applying the symmetrical hashing algorithm to at least a portion of the second data packet, resulting in a hash value of the second data packet; and
     route the second data packet to the first service node based on the hash value of the first data packet;
     wherein due to the symmetrical nature of the symmetrical hashing algorithm data between the first and second endpoints are sent to the first service node regardless of the direction in which the data was sent.

8. The system of claim 7, wherein the instructions further cause the first leaf node to:
   in response to determining that the second endpoint has moved from the second leaf node to a third leaf node, dynamically reconfigure the first leaf node to stop enforcing the ingress data policy to data packets transmitted from the first endpoint to the second endpoint.

9. The system of claim 8, wherein the instructions further cause the first leaf node to:
   after dynamically reconfiguring the first leaf node to stop enforcing the ingress data policy, receive a second data packet transmitted by the first endpoint to the second endpoint; and
   transmit the second data packet to the third leaf node, wherein the third leaf node enforces an egress data policy by applying the hashing algorithm to a Source Internet Protocol (SIP) value and a Destination Internet Protocol (DIP) value of the second data packet, resulting in a hash value of the second data packet, wherein the third leaf node routes the second data packet to the first service node based on the hash value of the second data packet.

10. The system of claim 7, wherein the first service node is a firewall.

11. The system of claim 7, wherein the first service node routes the first data packet to the second leaf node to be delivered to the second endpoint.

12. The system of claim 7, wherein a protocol value of the first data packet is also applied to the hashing algorithm to result in the hash value of the first data packet.

13. A non-transitory computer-readable medium storing instructions that, when executed by a switch fabric having a border defined at least by a plurality of leaf nodes connected by at least one spine node, the plurality of leaf nodes including at least first and second leaf nodes, cause the switch fabric to:
  receive by the first leaf node a first data packet transmitted by a first endpoint to a second endpoint connected to the second leaf node;
  enforce, at entry of the first data packet into the switch fabric at the first leaf node, an ingress data policy to the first data packet by applying a symmetrical hashing algorithm to at least a portion of the first data packet, resulting in a hash value of the first data packet;
  route the first data packet to a first service node based on the hash value of the first data packet;
  receive, by the second leaf node, a second data packet transmitted by the second endpoint to the first endpoint;
  enforce, at entry of the second data packet into the switch fabric at the second leaf node, an ingress data policy to the second data packet by applying the symmetrical hashing algorithm to at least a portion of the second data packet, resulting in a hash value of the second data packet; and
  route the second data packet to the first service node based on the hash value of the first data packet;
  wherein due to the symmetrical nature of the symmetrical hashing algorithm data between the first and second endpoints are sent to the first service node regardless of the direction in which the data was sent.

14. The non-transitory computer-readable medium of claim 13, wherein the instructions further cause the first leaf node to:
  in response to determining that the second endpoint has moved from the second leaf node to a third leaf node, dynamically reconfigure to stop enforcing the ingress data policy to data packets transmitted from the first endpoint to the second endpoint.

15. The non-transitory computer-readable medium of claim 14, wherein the instructions further cause the first leaf node to:
  after dynamically reconfiguring the first leaf node to stop enforcing the ingress data policy, receive a second data packet transmitted by the first endpoint to the second endpoint; and
  transmit the second data packet to the third leaf node, wherein the third leaf node enforces an egress data policy by applying the hashing algorithm to a Source Internet Protocol (SIP) value and a Destination Internet Protocol (DIP) value of the second data packet, resulting in a hash value of the second data packet, wherein the third leaf node routes the second data packet to the first service node based on the hash value of the second data packet.

16. The non-transitory computer-readable medium of claim 13, wherein the first service node is a firewall.

17. The non-transitory computer-readable medium of claim 13, wherein the first service node routes the first data packet to the second leaf node to be delivered to the second endpoint.

* * * * *